United States Patent [19]

Dessauer et al.

[11] 4,109,048

[45] Aug. 22, 1978

[54] RECORDING MATERIAL CONTAINING GAMMA-ALUMINA

[75] Inventors: Guido Dessauer, Dusseldorf-Gerresheim; Kurt Ramlow, Schafflund; Kurt Riecke, Kempen; Franz Wirnitzer, Flensburg, all of Fed. Rep. of Germany

[73] Assignee: Feldmühle Aktiengesellschaft, Düsseldorf-Oberkassel, Fed. Rep. of Germany

[21] Appl. No.: 760,274

[22] Filed: Jan. 18, 1977

[30] Foreign Application Priority Data

Jan. 20, 1976 [DE] Fed. Rep. of Germany ....... 2601865

[51] Int. Cl.[2] .......................... B32B 5/16; B41M 5/16

[52] U.S. Cl. ................................ 428/325; 106/193 J; 106/288 B; 282/27.5; 427/150; 427/151; 427/261; 428/328; 428/329; 428/332; 428/488; 428/914

[58] Field of Search ............... 428/328, 332, 329, 331, 428/242, 488, 914; 427/150, 151, 261; 106/288 B, 193 J

[56] References Cited

U.S. PATENT DOCUMENTS

| | | | |
|---|---|---|---|
| 3,223,546 | 12/1965 | Hemstock | 106/288 B |
| 3,619,345 | 11/1971 | Kubo et al. | 428/331 |
| 4,042,559 | 8/1977 | Abelson et al. | 428/242 |
| 4,046,941 | 9/1977 | Saito et al. | 428/329 |

*Primary Examiner*—Thomas J. Herbert, Jr.
*Attorney, Agent, or Firm*—Hans Berman

[57] ABSTRACT

A mixture of γ-alumina and its precursors containing 1 to 30% water volatile at 1000° C converts normally colorless dye materials such as crystal violet lactone, malachite green lactone, benzoyl leuco methylene blue and N-phenylleukauramine to the corresponding colored dyes upon contact, and improves the results achieved with recording material consisting essentially of a fibrous web and a pigment composition secured to the fibers of the web if the mixture amounts to at least 10% of the weight of the pigment composition. Particularly strong and stable colors are produced if the fibrous web is coated with a pigment composition prepared from an aqueous dispersion of the mixture and other pigments on which a basic compound is deposited from a water-soluble zinc salt by means of hydroxyl ions.

11 Claims, 5 Drawing Figures

RECORDING MATERIAL CONTAINING GAMMA-ALUMINA

Figure 1:
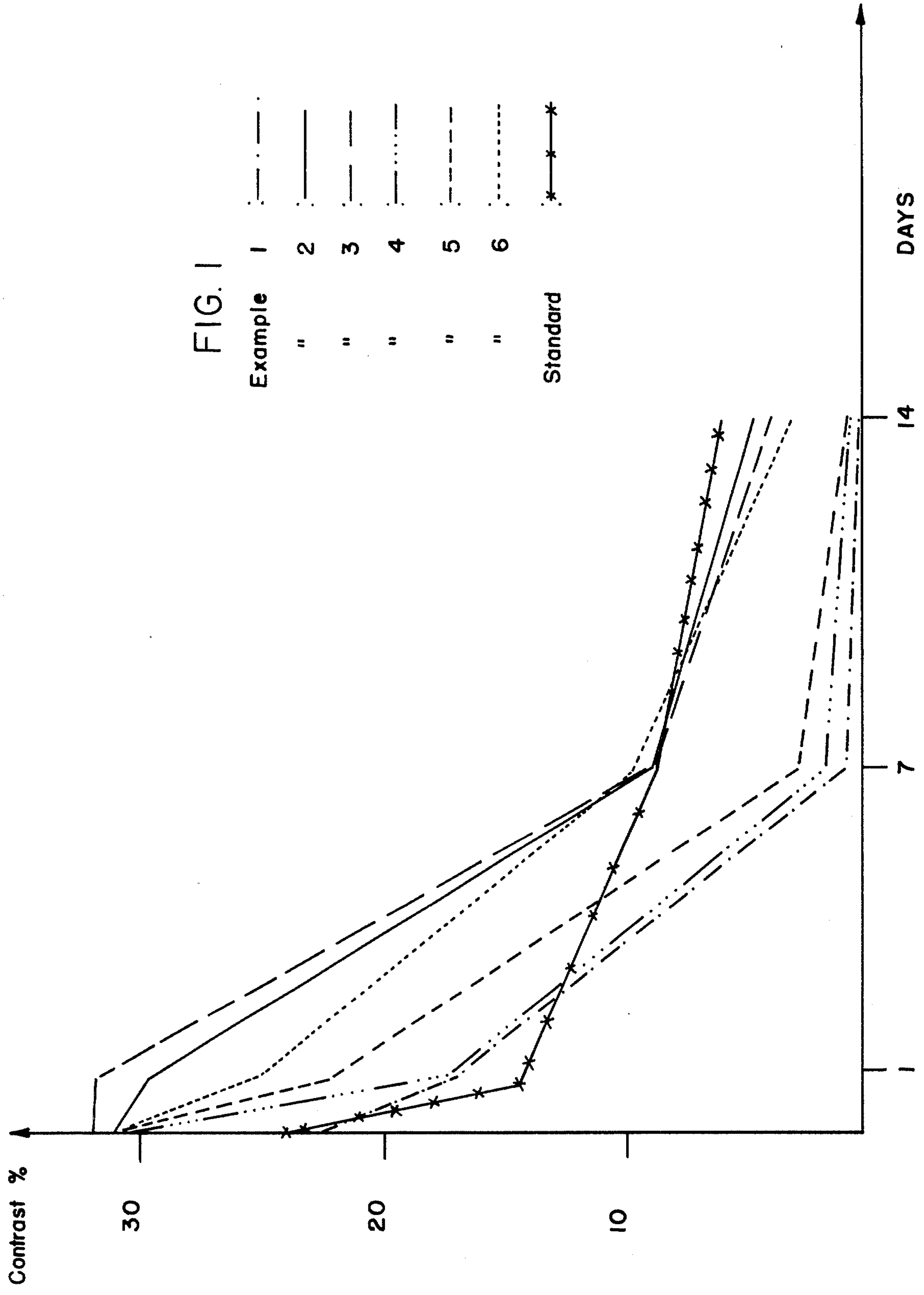

This invention relates to recording material, particularly to a fibrous web carrying a pigment composition secured to the fibers of the web and capable of converting a substantially colorless dye material such as crystal violet lactone to a colored dye, and to a method of preparing such a pigment composition.

It is known that crystal violet lactone, malachite green lactone, benzoyl leuco methylene blue, N-phenylleukauramine, and related colorless materials are converted to the corresponding colored dyes upon contact with certain acceptor pigments, particularly acidic clays such as attapulgite and silton clay. Carbonless copying paper may carry a surface coating of a colorless dye material on one surface and a coating of the acceptor on the other surface. When two sheets of such paper are superimposed, a colored image may be produced by locally applied pressure as by typing.

The colored images produced by means of the conventional clay acceptors tend to fade with time and particularly when exposed to light, and papers coated with the clays tend gradually to lose their ability of reacting with the colorless dye precursors. Coating compositions containing the clays and binders in an aqueous medium have relatively high viscosity which makes them difficult to apply to paper surfaces.

Some improvement in the aging and fading characteristics of known pigment compositions has been achieved by admixtures of zinc chloride or zinc acetate to the coating compositions. These compositions have relatively low pH values which make them incompatible with valuable binders and further increase viscosity.

Attempts at replacing the clays by other acceptors have not been successful because of shortcomings of a different nature. Thus, neither phenols, phenol derivatives, silica gel, alumina, nor calcium phosphate, which were proposed heretofore, have found acceptance.

The instant invention aims at providing a pigment composition of the general type described which is free of the shortcomings of conventional materials and combines the following features:

Rapid development of an intensely colored image.

Good aging characteristics of the developed image.

Good aging characteristics of the recording material prior to development of a colored image.

Good resistance of the colored image to daylight.

Convenient processing of coating compositions including the acceptor pigment composition.

It has now been found that a mixture of γ-alumina and its precursurs containing 1 to 30%, preferably 2 to 15%, chemically bound water volatile at 1000° C is an excellent dye acceptor and improves the characteristics of pigment compositions if present in amounts of at least 10 percent, all percentage values herein being by weight unless specifically stated otherwise.

γ-Alumina is the crystalline form of anhydrous aluminum oxide which is stable up to about 1000° C and converts to α-alumina at higher temperatures. Neither α-alumina, the substance usually referred to as "alumina", nor pure γ-alumina is a useful acceptor in a recording material of the type discussed here. Aluminum hydroxide and the various hydrated oxides of aluminum alone are equally ineffective or very poor substitutes for the known acidic clays when used as only pigments. It is not known at this time why mixtures of γ-alumina and its precursors containing at least 1%, preferably 2%, chemically bound water, but not more than 30%, and preferably not more than 15% water are superior to other forms of alumina and its hydrates.

The term "precursor of γ-alumina" is being used herein as a term embracing aluminum hydroxide and particularly the several partly dehydrated derivatives of aluminum hydroxide which are converted substantially completely to γ-alumina when heated slowly from 300° to 1000° C. These precursors include bohmite [aluminum oxide hydrate A10(OH)], η-alumina, and H alumina, but may include other crystallographically identifiable substances. It has been found, however, that the amount of water lost at 1000° C provides adequate guidance for the selection of the mixture.

Unsuited for the purpose of this invention are pure aluminum hydroxide which loses about 35% water at 1000° C, but also $Al_2O_3.H_2O$ (diaspore) which is converted to α-alumina at temperatures between 400° and 600° C. Aluminum oxide hydrate in the form of bohmite converts to γ-alumina.

The mixture of γ-alumina and its precursors suitable as an acceptor in recording material of this invention is readily prepared by calcining aluminum hydroxide [$Al(OH)_3$] at a temperature between 500° and 750° C to the desired residual water content. The end point is reached at a diminishing rate if the calcining temperature is between 600° and 710° C, and such operation is preferred.

Aqueous dispersions of the mixture containing 4% to 10% chemically bound, volatile water have particularly desirable low viscosities and excellent color producing characteristics. No improvement is achieved by further volatilizing the water content to less than 4%. The best mixtures have an average grain size of 0.2 to 0.8 μm, and the fraction larger than 0.8 μm should preferably not amount to more than 10%. The available surface area, as determined by the BET method, should be greater than 100 $m^2/g$, preferably greater than 140 $m^2/g$.

Ingredients of the pigment composition other than γ-alumina and its precursors may enhance the activity of the novel component or at least not interfere with it so as to constitute cost reducing diluents. No significant loss of contrast between the ultimately produced colored image and the substrate, normally paper, is observed if the pigment composition contains aluminum hydroxide and/or aluminum oxide hydrate (bohmite or hydrargillite) in amounts of 10% to 40% of the weight of the mixture of γ-alumina and its precursors.

Conventional acceptors, such as the clays mentioned above, may be used jointly with the γ-alumina mixture if the latter amounts to at least 10% of the total pigment composition, but the desirable properties of the mixture prevail particularly at 30% or more, as much as 50% being desirable in a mixture containing clays as the only other pigment present in significant amounts. The clays, in conjunction with the γ-alumina mixture, improve lightfastness.

Further improvement is achieved by the simultaneous presence of zinc oxide, zinc hydroxide, or water-insoluble basic zinc salts in the pigment composition. The zinc compounds should be equivalent in zinc content to 2% to 50% ZnO, based on the total weight of the pigment. Aside from other desirable characteristics described hereinbelow, the zinc-bearing recording materials of the invention are distinguished by good storage stability. For reasons not fully understood at this time, the basic zinc compounds are most effective in the presence of aluminum hydroxide (hydrargillite or gibbsite).

The basic zinc compounds are most effective if precipitated on the particles of the mixture and of other particulate components of the pigment composition from a dissolved zinc salt by means of a source of hydroxyl ions. It is thought that the uniform distribution of small particles of zinc compound over the surfaces of the other pigment particles accounts for the observed improvement.

Compounds of copper, chromium, manganese, iron, cobalt, and nickel, particularly copper compounds, when present in the pigment composition, improve resistance of the colored images to daylight. While amounts of the several metal compounds corresponding to 0.1% to 10% of the respective oxides, based on the total pigment composition, are beneficial, best results are achieved with compounds of divalent copper corresponding in metal content to 0.1 to 3% cupric oxide, based on the total pigment weight.

Best results have been achieved so far with pigment compositions consisting of 50 – 75% of a combined amount of $\gamma$-alumina, its precursors, aluminum hydroxide, and aluminum oxide hydrate, 20% – 45% of a conventional clay acceptor, 5 to 30%, calculated as ZnO, of basic zinc compounds, and 0.1 to 3%, calculated as CuO, of a divalent copper compound.

The pigment compositions of the invention may be applied to a fibrous substrate as a coating composition containing a suitable binder, as is conventional in itself. It has been found that the finely dispersed mixture of $\gamma$-alumina and its precursors is strongly adsorbed by the individual fibers of a paper web so that the recording material of the invention may be prepared on a paper making machine from a fiber dispersion containing dispersed pigment composition of the invention. The pigment is exhausted from the aqueous carrier, and is not released from the dried paper as a dust. The pigment dispersion, of course, may also be applied by means of the size press of the paper machine, and this procedure is preferred with pigment compositions containing the afore-described metal compounds.

Because of the low viscosity of aqueous dispersions of the $\gamma$-alumina mixture, pigment compositions of the invention may be incorporated in otherwise conventional coating compositions in higher concentrations than were available heretofore with acidic clays without causing difficulties on the coating machine.

When zinc salts are included in the pigment composition, the preferred water soluble zinc salt initially added to the pigment dispersion is a zinc-amine complex produced by adding an excess of ammonium hydroxide to a solution of a zinc salt so as to dissolve the initially formed zinc hydroxide. The resulting composition of relatively high pH is compatible with many binders, particularly synthetic resin binders, so that the pigment composition may amount to 10 to 25% of the weight of all solids in the coating composition. The necessary amount of binder solids can be further reduced by the simultaneous addition of urea, thiourea, or diphenylthiourea, or of surface active dispersing agents, such as water-soluble salts of polycarboxylic acids.

If conventional clays are employed in the coating composition, they are preferably added after dispersion of the $\gamma$-alumina mixture and other aluminum compounds in the presence of dispersing agents. The viscosity of the coating composition prepared in this manner is lower than it would have been had the clays been admixed initially.

The pigment compositions of this invention may be employed in recording material in many ways, including those known in connection with other pigment compositions. Thus, the pigment composition may be applied to one surface of a fibrous web, normally paper, and the other surface may remain uncoated or receive a coating of encapsulated dye precursors, of a wax having the dye precursors dispersed therein, and the like.

The pigments may be combined in a common coating layer with encapsulated dye precursors, or layers of the pigment composition and of the dye precursors may be superimposed on the same surface of the fibrous web. As mentioned above, the pigment compositions of the invention may also be distributed uniformly throughout the thickness of a web when added to the furnish for a papermaking machine. Similar results are achieved on the size press with pigment dispersions of adequately low viscosity (less than 200 cp).

Figure 2:
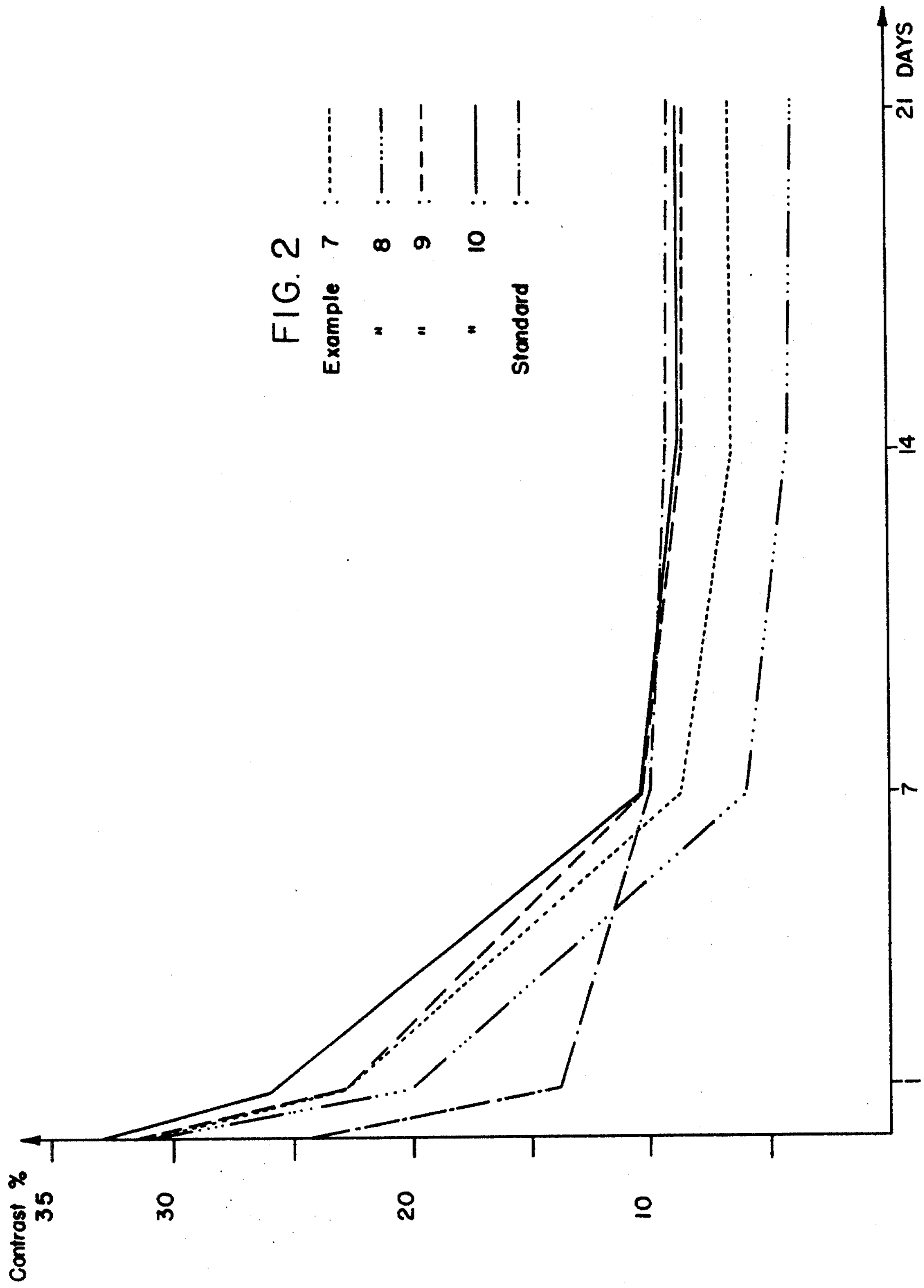
Figure 3:
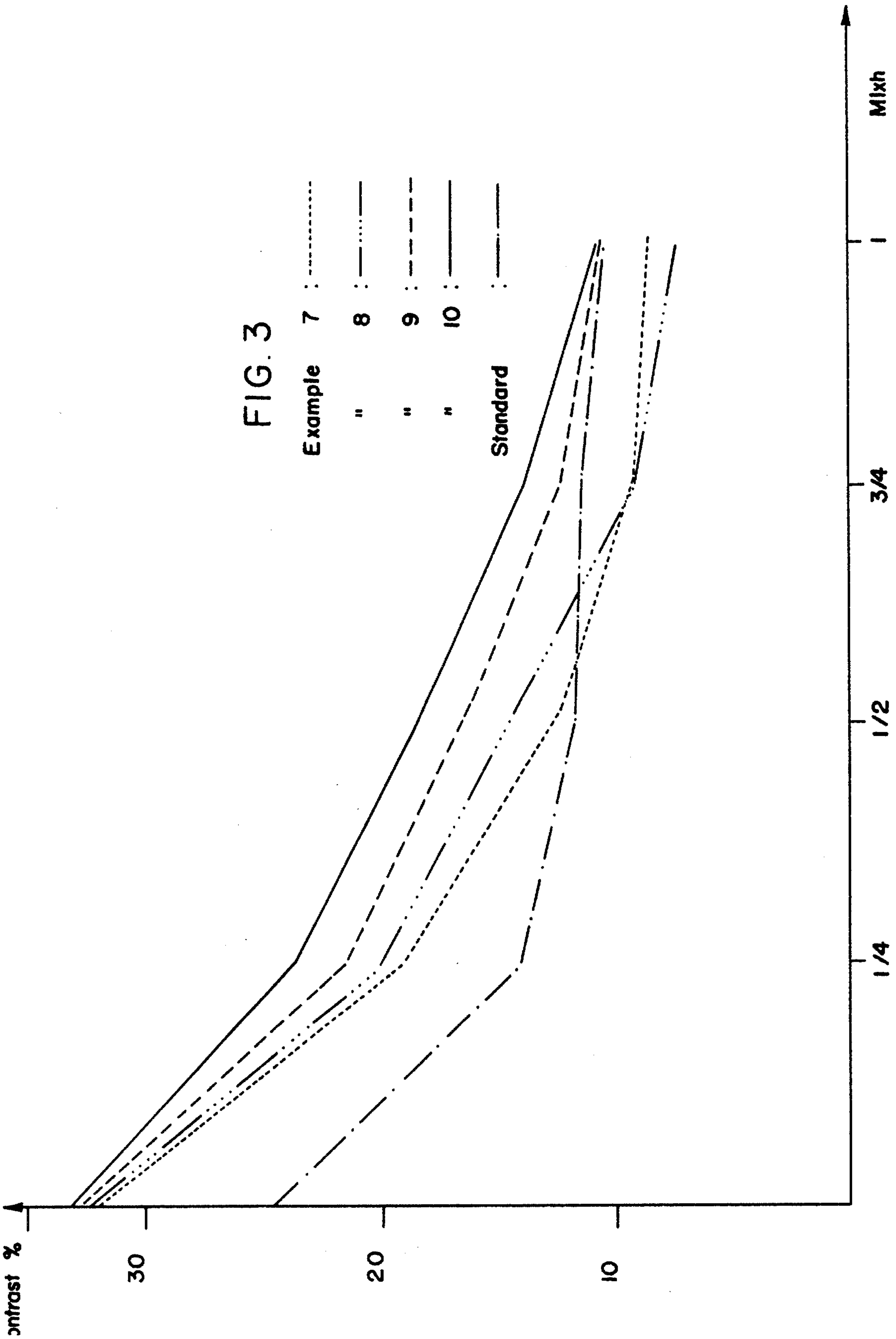
Figure 4:
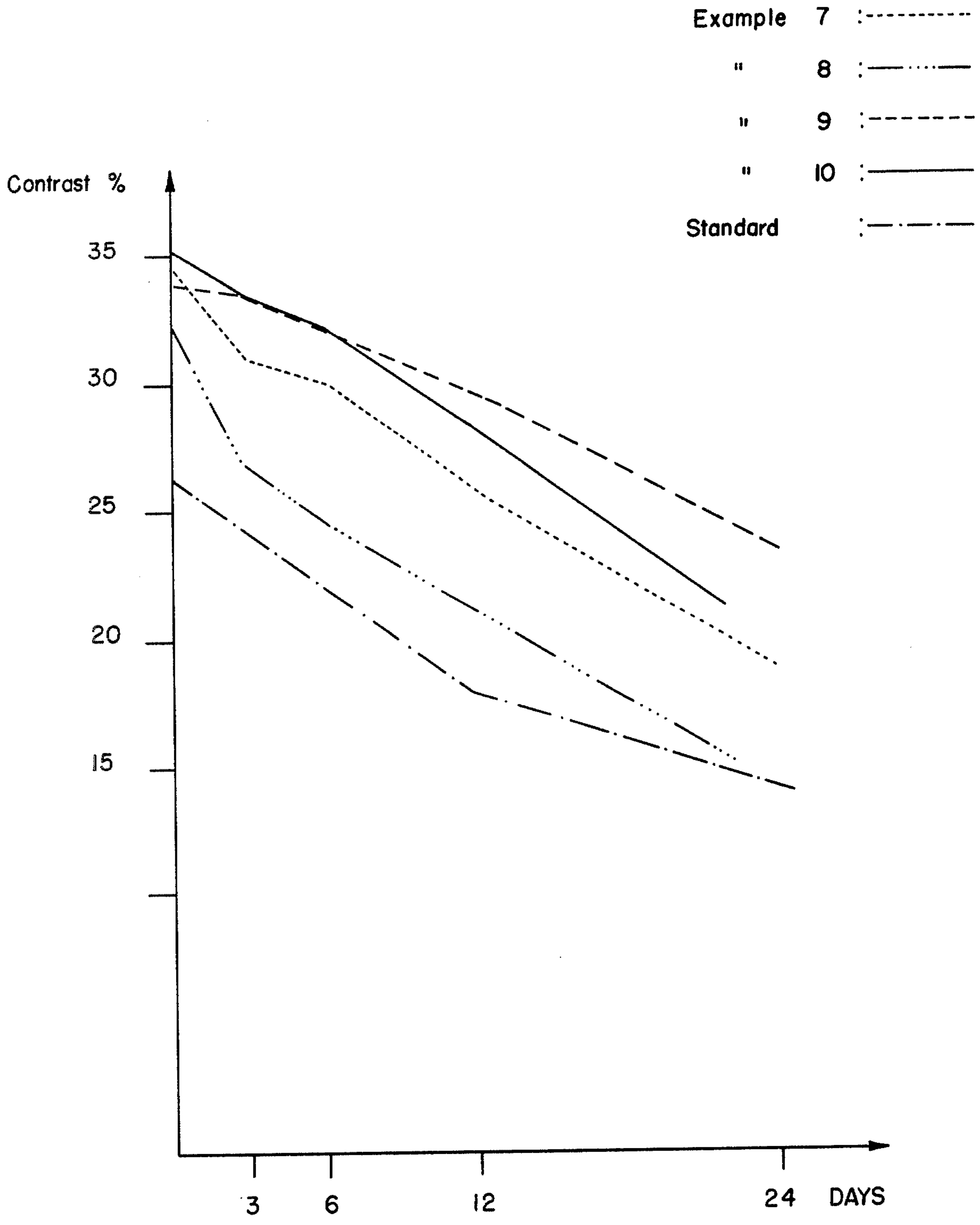
Figure 5:
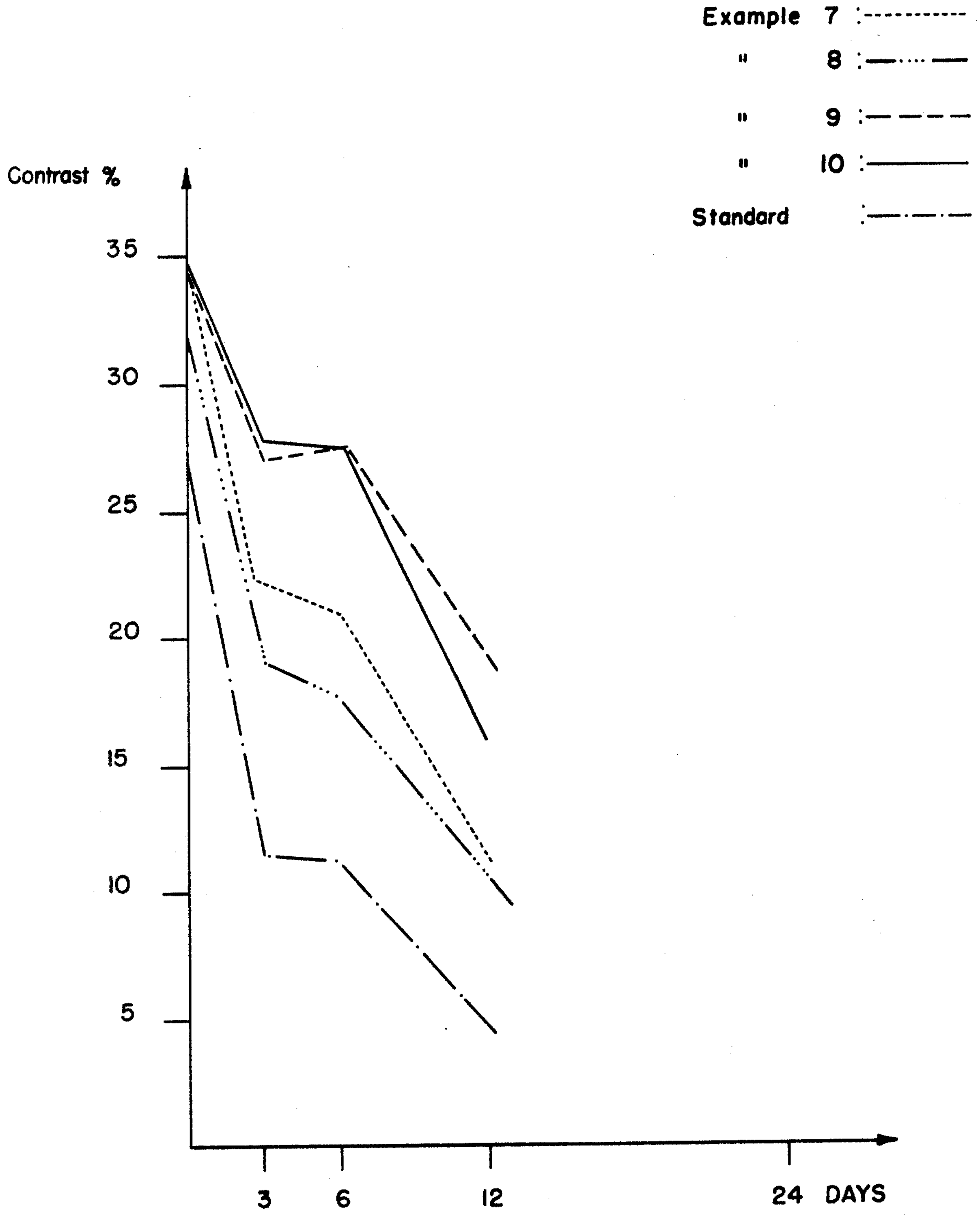

The invention will further be illustrated by the following Examples and the attached drawing in which FIGS. 1 to 5 graphically illustrate changes in the contrast between colored images produced by the procedures of the Examples and a white substrate as a function of time. More specifically:

FIG. 1 shows the change of contrast upon exposure to daylight of material produced according to Examples 1 to 6;

FIG. 2 similarly shows the effect of daylight on colored images prepared in Examples 7 to 10;

FIG. 3 illustrates the effect of artificial light on the colored images of Examples 7 to 10;

FIG. 4 graphically represents the results of aging tests at 70° C and 75% R.H. performed on the colored images of Examples 7 to 10; and FIG. 5 shows the effect of similar aging on coated papers prior to contact with dye precursors.

The colored images were produced in all instances by typing on a sandwich consisting of a standard sheet covered with encapsulated dye precursor and the acceptor coated sheet to be tested. The tested sheet was uniformly covered with lower-case letters x by typing on the standard sheet while the dye capsules were superimposed on the coated face of the tested sheet. Albedo of the tested sheet before and after typing and after the aging test was measured in a conventional, standardized procedure, and the contrast value before and after the aging test was calculated from the formula $$(A_o - A_1)/A_o = \% \text{ contrast}$$

wherein $A_o$ is the albedo of the blank sheet and $A_1$ the albedo of the typed sheets. The initial contrast value and its decrease with time are evident from the drawing figures.

The standard sheet carrying the dye was prepared by coating a paper sheet with a composition consisting of 85% liquid carrier and 15% solids, the solids consisting of 100 parts (by weight) microcapsules, 40 parts cellulose powder, and 30 parts oxidized starch. The coating provided 4 g capsules per square meter. The capsules contained a 6% solution of crystal violet lactone and N-benzoyl leuco methylene blue in a weight ratio of 3:1.

For comparison purposes, a standard acceptor sheet was included in each tested batch. It was coated with a composition consisting of 2800 parts (by weight) water, 370 parts 34% water glass, 88 parts Attagel (attapulgite of colloidal particle size), 1080 parts acidic Japanese silton clay, 450 parts of a 50% latex of carboxylated butadiene/styrene copolymer. The composition, as mixed, had a pH of 9.6, and it was adjusted to pH 10.4 by addition of 18 parts 33% sodium hydroxide solution.

To permit comparison between the results of the several Examples, the γ-alumina mixture employed in all instances was taken from the same batch. It contained 10% volatile water and had an average particle size of 0.5 μm, the fraction larger than 0.8 μm amounting to approximately 6%.

EXAMPLE 1

Paper weighing 45 g/m[2] was prepared from 40% bleached sulfate pulp made from coniferous wood and 60% bleached cellulose from the wood of deciduous trees on a conventional Fourdrinier machine, and one face of the paper was coated on a roller coating machine with air brush for fine dosing of the coating composition applied. The same paper and coating equipment were used also in Examples 2 to 10.

The coating composition employed consisted of 106 parts water, 200 parts γ-alumina mixture, and 21 parts of a 50% latex of carboxylated butadiene-styrene copolymer, all parts in these Examples being by weight. It had a pH of 8.5. It was applied to the paper at a rate of 6 g/m[2] on a dry basis. The coated and dried paper was calendered, and colored images of letter *x* were produced in the manner described above.

As is shown in FIG. 1, the typed paper showed an initial contrast of only 22%, slightly less than the standard comparison sample, and lost much of its color within one week.

EXAMPLE 2

The procedure of Example 1 was repeated, but the coating composition employed contained additionally 94 parts of a 10% aqueous solution of $CuSO_4.5H_2O$ and 0.3 parts sodium salt of polyacrylic acid as a dispersing agent. The composition thus contained as much metal as 3 parts copper oxide per 100 parts of the γ-alumina mixture. It had a pH of 5.4.

As is evident from FIG. 1, both the initial color contrast of the typed image and its light fastness were greatly improved.

EXAMPLE 3

In the otherwise unchanged procedure of Example 2, enough $ZnSO_4.7H_2O$ was added to the coating composition to provide as much zinc as by adding 2 g ZnO per 100 g γ-alumina mixture. This made it necessary to increase the amount of added latex binder of which a portion was coagulated. The coating composition thus had the following ultimate composition, the ingredients being listed in the order in which they were combined:

106 Parts water
94 Parts 10% $CuSO_4.5H_2O$ solution
100 Parts γ-alumina mixture
70 Parts 10% $ZnSO_4.7H_2O$ solution
14 Parts water
0.3 Parts sodium polyacrylate
49 Parts 50% carboxylated butadiene-styrene copolymer latex
pH 5.5.

While the initial contrast of the color produced was good, it deteriorated rapidly upon exposure to light.

EXAMPLE 4

The procedure of Example 3 was repeated, but the zinc sulfate was replaced by a corresponding amount of a complex zinc-amine salt prepared by reacting $ZnCl_2$ with ammonia. The coating composition was thus prepared by mixing, in the following order:

200 parts water
100 parts γ-alumina composition
13.22 parts 35.7% solution of $Zn(NH_3)_4(OH)_2.(NH_4Cl)_2$
0.3 parts sodium polyacrylate
43.8 Parts 50% carboxylated butadiene-styrene copolymer latex
140 parts water
pH 9.9.

It contained the equivalent of 2 g ZnO per 100 g γ-alumina mixture.

While the initial contrast obtained with the coated paper was higher than in Example 1, there was no significant difference after one week of exposure to daylight.

EXAMPLE 5

The coating composition of Example 4 was modified to increase the amount of zinc-amine salt solution to 66.6 parts which required an increase in the latex to 53 parts while the final water addition could be reduced to 80 parts.

The colored pattern produced in the manner outlined above was not significantly improved initially nor better after 1 week.

EXAMPLE 6

The coating composition of Example 5 was further modified by adding copper sulfate in an amount corresponding in metal content to 1.9 parts CuO per 100 parts of the γ-alumina mixture. The composition thus was prepared from the following ingredients, in the order listed:

200 parts water
100 parts γ-alumina mixture
66.6 parts 35.7% solution of $Zn(NH_3)_4(OH)_2(NH_4Cl)_2$
0.3 parts sodium polyacrylate
26 parts 23% $CuSO_4.5H_2O$ solution
53 parts 50% latex of carboxylated butadiene-styrene copolymer
90 parts water
pH 9.5.

The results of the lightfastness test on this material are closely similar to those for the products of Examples 2 and 3.

As compared to the standard acceptor sheet which represents properties of typical good reproducing material currently in practical use, the γ-alumina mixture of the invention is seen in FIG. 1 to increase original contrast when combined with secondary ingredients. The better contrast is maintained for several days, up to one week, the most important period, and can be held at approximately the same level as in the standard sheet after this period.

Further improvement in light resistance and resistance to aging can be achieved in the acceptor-coated webs of the invention by the combination of γ-alumina mixture with additional ingredients, as will be shown in FIGS. 2 to 5 with reference to Examples 7 to 10.

EXAMPLE 7

The following components were sequentially introduced into a vat equipped with a stirrer:

312.5 parts water
25.45 parts $ZnCl_2$, technical grade
41.35 parts conc. ammonium hydroxide solution
22.73 parts urea
1.6 parts sodium polyacrylate
27.3 parts hydrargillite
40.9 parts γ-alumina mixture
31.8 parts silton clay, an acid-washed Japanese clay
47.73 parts 50% latex of carboxylated butadiene-styrene copolymer The zinc chloride was partly precipitated on the insoluble pigment particles in the form of an extremely finely dispersed particulate surface deposit, and partly converted to soluble zinc-amine salt. The pH of the coating composition so prepared was 8.9.

The coating composition was employed in the manner described in the preceding Examples. During drying of the coating, the zinc-amine complex was decomposed, and additional particles of zinc oxide, zinc hydroxide, zinc oxide hydrate, or basic zinc chloride were deposited on the particles of the γ-alumina mixture and of the hydrargillite.

FIG. 2 shows significantly improved initial contrast as compared to the standard acceptor sheet and a smaller loss of contrast in the first day of continuous exposure to daylight. When the sheet prepared in Example 7 and the standard sheet were exposed to a xenon lamp under standardized conditions, the sheet of Example 7 showed better light fastness up to a radiation input of ½ Mlxh (megaluxhour). Substantial improvement over the entire testing period, 24 days and 12 days respectively, was found in aging tests of the colored image (FIG. 4) and of the blank, acceptor-coated sheet prior to coloring (FIG. 5) at 70° C and 75% R.H.

EXAMPLE 8

The coating composition of Example 7 was modified by replacing the hydrargillite by additional γ-alumina mixture, other changes being relatively minor. The coating composition was prepared from the following ingredients in the manner of Example 7:

390 parts water
36.36 parts zinc chloride
41.36 parts concentrated ammonium hydroxide solution
22.73 parts urea
1.59 parts sodium polyacrylate
68.18 parts γ-alumina mixture
31.82 parts silton clay
47.73 parts 50% latex of carboxylated butadiene-styrene copolymer
pH 7.8.

As is seen in FIGS. 2 to 5, the test results are similar to, but partly slightly inferior to those produced with the coating composition of Example 7.

EXAMPLE 9

In a coating composition otherwise similar to those of Examples 7 and 8, the silton clay was replaced by an acid-leached montmorillonite containing 3.4% $Fe_2O_3$. The coating composition was prepared from the following components in the manner described above:

135 parts water
16.74 parts zinc chloride
47.4 parts concentrated $NH_4OH$ solution
66.6 parts γ-alumina mixture
43.3 parts montmorillonite
0.6 parts sodium polyacrylate
200 parts water
42.4 parts 50% latex of carboxylatd butadiene-styrene copolymer
pH 9.

As is evident from FIGS. 2 to 5, the addition of iron improves results as compared to those of Examples 7 and 8 in the same manner as copper enhanced the properties of the acceptor sheets illustrated in FIG. 1 (Examples 2, 3 and 6).

EXAMPLE 10

When urea, thiourea, or diphenylthiourea was added to a coating composition analogous to that of Example 9, the amount of necessary binder (latex) could be reduced substantially, thereby reducing the cost of the composition to a significant extent.

A typical composition of this kind was prepared from the following ingredients:

519.48 parts water
22.73 parts urea
36.36 parts zinc chloride
45.19 parts conc. $NH_4OH$ solution
68.18 parts γ-alumina mixture
31.82 parts montmorillonite
1.56 parts sodium polyacrylate
47.79 parts 50% latex of carboxylated butadiene-styrene copolymer
pH 8.3.

The results of the tests represented in FIGS. 2 to 5 for this material are close to the best for all compositions tested.

EXAMPLE 11

In a mixing vat, 50 parts bleached pulp of coniferous wood ground to a freeness of 60° SR and 50 parts bleached birch pulp ground to a freeness of 25° SR were mixed with each other, with 10% γ-alumina mixture (based on the dry fiber weight), Attagel hydrogel containing 95% water and dry solids corresponding to 8% of the dry fiber weight, and with enough water to make a fiber dispersion having a consistency of about 0.5%.

Paper weighing 50 g/m² was prepared on a Fourdrinier machine in a conventional manner. The white water from the machine contained neither γ-alumina nor attapulgite in more than insignificant trace amounts, and the dried paper did not release a dust of inorganic material. It produced colored copies of useful contrast in the manner described in the preceding Examples without requiring a coating. Further improvements of this technique are being disclosed in our simultaneously filed application entitled "Recording Material Containing Asbestos".

EXAMPLE 12

Paper was prepared on a Fourdrinier machine in the manner described in Example 1 and was further treated on the size press of the machine with a composition prepared from:

30 parts soluble starch
50 parts zinc chloride
5 parts $CuSO_4.5H_2O$
18 parts γ-alumina mixture and enough water to make a dispersion containing 9% solids.

Each side of the treated paper received enough of this composition to amount to 1.25 $g/m^2$ on a dry basis. The treated and dried paper produced copies of adequate contrast in the afore-described typing test.

While only a single binder material, a single polycarboxylic acid as a dispersing agent, and cellulose fibers as the sole constituent of a paper web have been specifically referred to in the Examples, these materials are not relevant to the invention. Cellulose fibers are preferred in recording material of the invention in which the γ-alumina mixture is uniformly distributed throughout the thickness of the fibrous web, but other fibers may be mixed with the cellulosic material. In surface-coated webs, the nature of the fibers may be chosen freely. The entire range of dispersing agents and binders conventional in this art may be employed in preparing recording material according to this invention.

It should be understood, therefore, that the foregoing disclosure relates only to preferred embodiments of the invention, and that it is intended to cover all changes and modifications of the examples of the invention chosen herein for the purpose of the disclosure which do not constitute departures from the spirit and scope of the appended claims.

What is claimed is:

1. In a recording material including a fibrous web and a pigment composition secured to the fibers of said web and capable of converting a substantially colorless member of the group consisting of crystal violet lactone, malachite green lactone, benzoyl leuco methylene blue, and N-phenyl-leukauramine to a colored dye, the improvement in the pigment composition which consists in said composition including at least 10 percent by weight of a mixture of γ-alumina and precursors of γ-alumina, said mixture containing 1 to 30 percent chemically bound water volatile at 1000° C, and said precursors being hydrated forms of aluminum oxide capable of being converted substantially completely to γ-alumina when heated from 300° to 1000° C.

2. In a material as set forth in claim 1, the amount of said water in said mixture being between 2 and 15 percent by weight.

3. In a material as set forth in claim 1, said pigment composition further including 10 percent to 40 percent of at least one compound selected from the group consisting of aluminum hydroxide and aluminum oxide hydrate, based on the weight of said mixture.

4. In a material as set forth in claim 1, said pigment composition further including a clay capable of converting one of said colorless members to said dye.

5. In a material as set forth in claim 1, said pigment composition further including an amount of a compound of copper, manganese, chromium, iron, cobalt or nickel equivalent in metal content to 0.1 to 10 percent of the corresponding metal oxide, said oxide being CuO, MnO, $Cr_2O_3$, $Fe_2O_3$, CoO, or NiO, based on the weight of said pigment composition.

6. In a material as set forth in claim 1, the weight of said composition essentially consisting of a combined total of 50 to 75% of said γ-alumina mixture, of aluminum hydroxide, and of aluminum oxide hydrate, 20 to 45% clay, 5 to 30% of the zinc oxide equivalent of a basic zinc compound, and 0.1 to 3% of the cupric oxide equivalent of a compound of divalent copper, the combined weight of said aluminum hydroxide and said aluminum oxide hydrate being between 10% and 40% of the weight of said mixture, said clay being capable of converting one of said colorless members to said dye.

7. In a material as set forth in claim 1, said mixture being uniformly distributed among the fibers of said web.

8. In a material as set forth in claim 1, said mixture having an average particle size of 0.2 to 0.8 μm, the fraction of said mixture having a particle size greater than 0.8 μm amounting to not more than 10%.

9. In a material as set forth in claim 1, said pigment composition further including an amount of at least one basic zinc compound equivalent in zinc content to 2 to 50 percent zinc oxide based on the weight of said pigment composition.

10. In a material as set forth in claim 9, said zinc compound having a particle size smaller than the average particle size of said composition.

11. In a material as set forth in claim 9, said mixture being particulate, and at least a portion of said zinc compound being uniformly distributed over the surface of the particles of said mixture.

* * * * *